May 10, 1927.

W. P. BLANCHARD

TELEMETRIC APPARATUS

Filed Dec. 4, 1924

1,628,450

2 Sheets-Sheet 1

Inventor:
Walter P. Blanchard,
by *Alexander F. Smith*
His Attorney.

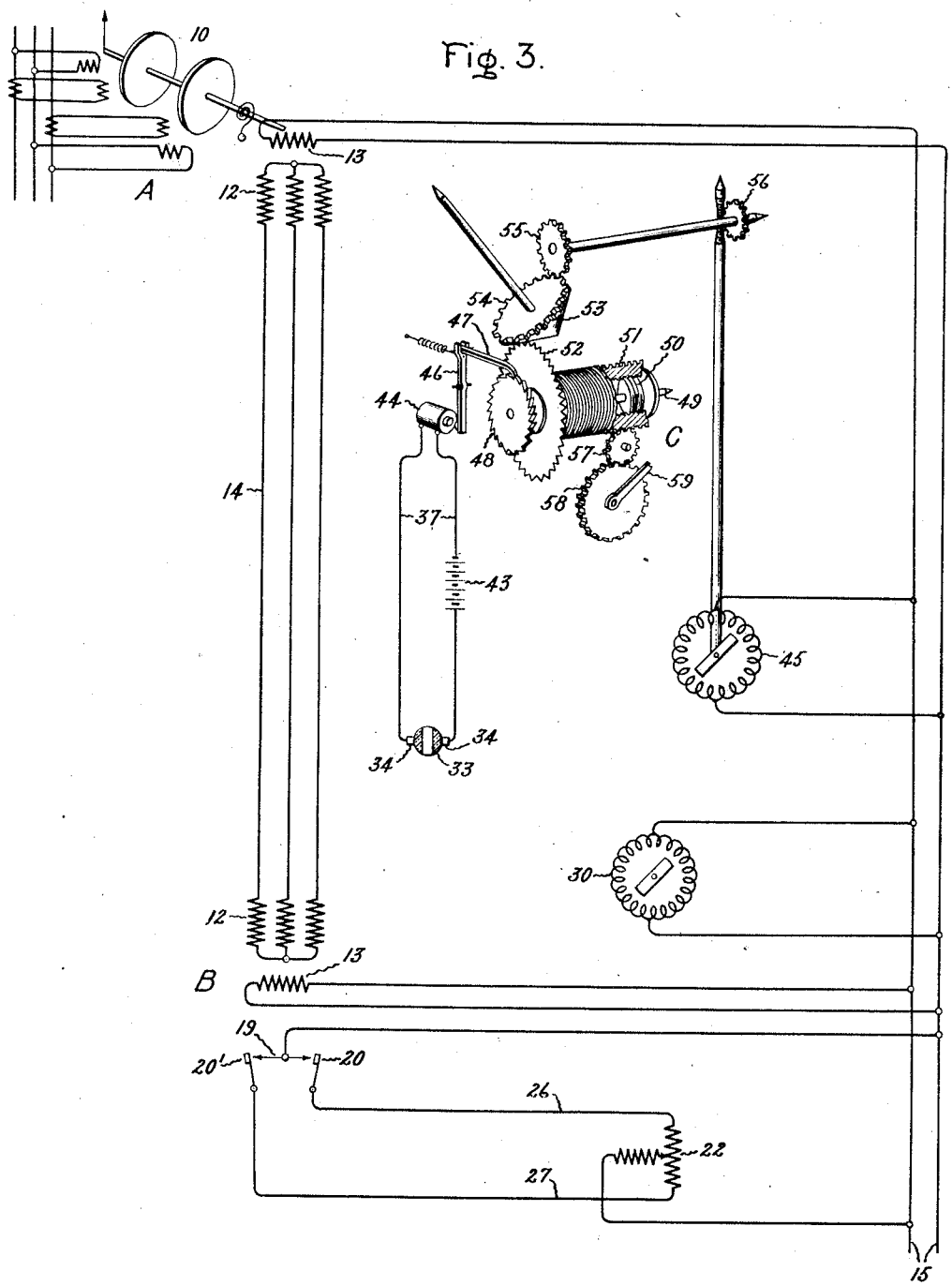

Patented May 10, 1927.

1,628,450

UNITED STATES PATENT OFFICE.

WALTER P. BLANCHARD, OF WINTHROP, MASSACHUSETTS, ASSIGNOR TO GENERAL ELECTRIC COMPANY, A CORPORATION OF NEW YORK.

TELEMETRIC APPARATUS.

Application filed December 4, 1924. Serial No. 754,002.

My invention relates to a system and apparatus for transmitting movements to a distant point. Although not limited thereto, the invention is particularly adapted for transmitting instrument indications over a considerable distance. In electric power systems, it oftentimes becomes desirable for a load despatcher or operator to be able to tell at all times the reading of a given instrument which is situated in a remote power station. Where the transmitting distance is comparatively short, a known telemetric system, hereinafter referred to as the selsyn system, has been used. For long distances, for example 50 miles, the selsyn system is not practicable. My invention relates to a long distance telemetric system, and in particular to the transmitter of such a system which may be operated from an existing selsyn system.

In carrying my invention into effect, I provide a transmitter which is arranged to generate current impulses at a rate which is proportional to the deflection or indication to be transmitted and provide a receiver which may be operated by such impulses to reproduce the desired indication.

Figure 1:
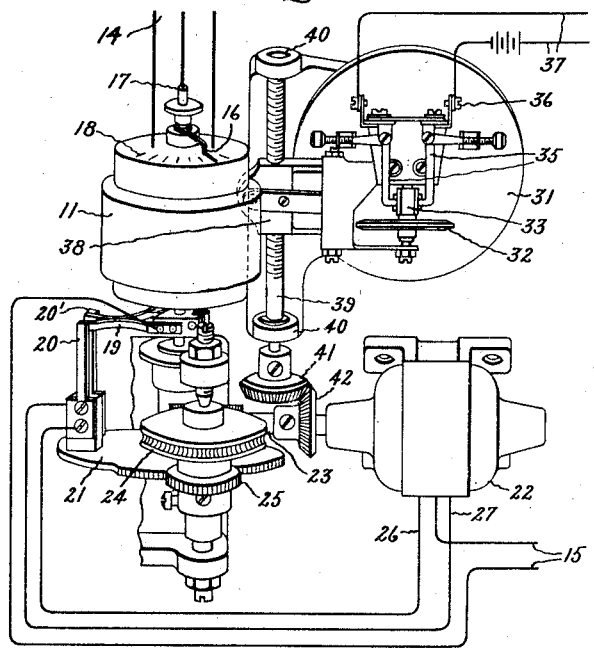
Figure 2:
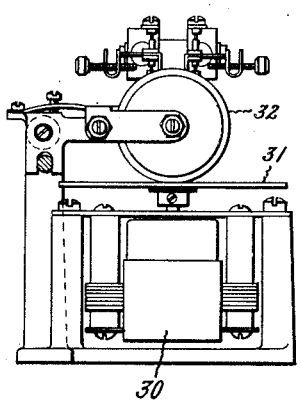

The features of my invention which are believed to be novel and patentable will be pointed out in the claims appended hereto. For a better understanding of my invention, reference is made in the following description to the accompanying drawings in which Fig. 1 represents a perspective view of a selsyn receiver and an impulse transmitter arranged according to my invention; Fig. 2 represents a different view of the transmitter shown in Fig. 1; and Fig. 3 represents the wiring diagram of a system in which these devices are used together with a suitable receiving device.

Referring briefly to Fig. 3, A represents a primary transmitting station at which is located an indicating wattmeter 10, the indications of which it is desired to transmit to stations B and C. For the purpose of illustration, stations A and B will be assumed to be located at different points in the same power station, and station C at a distance of several miles from stations A and B. The telemetric system between stations A and B is the known selsyn system such as is described in United States Patent 1,612,117 and that between stations B and C is of the impulse type. The selsyn transmitter at station A and the selsyn receiver at station B are similar in construction, the exterior appearance of the receiver being represented at 11 in Fig. 1. These two devices comprise stationary stator members provided with three phase windings 12 and rotatable armature members provided with field coils 13. The stator windings are connected together by a three-phase line 14. The field coils are constantly energized from a common alternating current source 15. The armature 13 of the selsyn transmitter is secured to the shaft of the indicating wattmeter 10 and is consequently moved with respect to the stator coils 12 in accordance with the indication of the wattmeter. The two armature field elements 13 generate currents in the stator windings 12 and the armature of the receiving selsyn will be moved into such a position by such a current as to bring them into phase. Consequently, the position of the armature of the receiving selsyn at station B will always correspond to the indication of the wattmeter 10, and a pointer 16 (see Fig. 1) secured to the shaft 17 of the selsyn receiver and cooperating with a stationary scale 18 will reproduce the wattmeter indications.

As represented in Fig. 1, the lower end of the shaft 17 carries a pair of spring contacts 19 cooperating with relatively movable contacts 20 and 20'. The last mentioned contacts are secured to a gear sector 21 having an axis of rotation common to shaft 17. Gear sector 21 is geared to and is moved by a motor 22 by means of shaft 23, worm gear 24 and pinion gear 25. Motor 22 is reversible, it being operable in one direction when energized from source 15 through contacts 19 and 20 and connection 26 and in the other direction when energized through contacts 19 and 20' and connection 27. Contacts 19 have a very small clearance between contacts 20 and 20' and the arrangement is such that whenever one or the other of these contacts is closed, the motor 22 will be started in the proper direction to open such contact and stop the motor. Such a follow-up system is well known and operates to maintain the gear sector 21 in such a position as to normally keep the circuit of the motor open with the shaft 17 free to turn, the position of gear sector 21 corresponding to that of pointer 16 and the indication of wattmeter 10 at station A.

The purpose of the follow-up system is to determine the setting of the impulse transmitting device which will now be explained. The impulse transmitter is mounted on the same base or framework with the parts just described. The impulse transmitter has a constant speed motor 30 (see Fig. 2) which drives a friction disc 31. Bearing on disc 31 is a friction wheel 32 which drives a commutator interrupter 33, a cross section of which is shown in Fig. 3. Brushes 34 bear against opposite sides of this interrupter so that once each half revolution a circuit is established between them. The brushes are suitably supported in position by adjustable brush holders 35 which are provided with connection 36 to the outgoing circuit 37. The disc 32, commutator 33 and the brush rigging is carried on a movable support 38 which is arranged to move the disc 32 toward and away from the center of disc 31 along a radius thereof. The support 38 is provided with a threaded opening forming a nut into which is threaded a worm shaft 39 suitably supported in bearings 40. The shaft 39 is rotated by the motor 22 by means of the bevel gears 41 and 42, respectively secured to shafts 39 and 23. The adjustment is such that when the wattmeter indication at station A is zero, disc 32 will be positioned at the center of disc 31 and will not be rotated. By means of the follow-up device, the disc 32 will be moved out along a radius of the disc 31 to a position proportional to the wattmeter deflection and the position of gear sector 21 so that the speed of rotation of disc 32 will be directly proportional to the wattmeter indication at station A. When the indication becomes constant at any value, the motor 22 and support 38 will remain stationary with the disc 32 at a distance from the center of disc 31 which is proportional to the particular indication and the rate of the impulses transmitted over the circuit 37 will also be directly proportional to this indication.

Referring again to Fig. 3, it will be noted that the motors 22 and 30 are connected to the alternating current source 15. Motor 22 may be a split field alternating current motor arranged to be operated in opposite directions, depending upon which section of the field is energized. Motor 30 may be a self-starting synchronous motor. The circuit 37 contains a source of supply represented as a storage battery 43 and at the distant station C, this circuit contains a relay 44 for operating the receiving device.

The receiving device represented at station C is in general similar to the device represented in Fig. 4 of Hall Patent 1,331,059. Other devices for accomplishing the desired result may be used. The device at station C comprises a variable ratio differential movement, one part of which is driven at constant speed by a motor 45 and another part of which is driven at a variable speed by the impulse relay 44. The motor 45 will preferably be of a type which has characteristics similar to that of motor 30. The relay 44 operates, through its armature 46 and ratchet pawl 47, a ratchet wheel 48 secured to a shaft 49. Secured to shaft 49 is an exterior threaded nut 50 threaded into a cylinder 51. The cylinder 51 is driven through disc 52, the variable speed cone member 53, gears 54, 55 and 56, from the constant speed motor 45. To ensure a good driving connection between disc 52 and cone 53 the periphery of the disc may be serrated as shown and the surface of cone 53 may be of rubber or other material suitable to complete a good driving connection. The exterior of cylinder 51 is threaded and meshes with a gear 57 which operates a gear 58 and an indicating pointer 59. The arrangement is such that the rotation of nut 50 by relay 44 tends to move cylinder 51 and its driving disc 52 to the left along the lower surface of the cone drive 53, thereby increasing the driving ratio between the cone and disc. The direction of rotation of cylinder 51 by disc 52 and cone 53 is such as to move the cylinder to the right, thereby reducing the driving ratio between the cone and disc. The result of this arrangement is to cause the parts to continuously move toward such a position as to make the speed of cylinder 51 equal to that of shaft 49 and in so doing, to move the indicator 59 which will then give an indication proportional to the average speed of shaft 49. The indicator 59 does not instantaneously follow sudden fluctuations of the indication of the wattmeter 10, but gives an indication which is the average indication of wattmeter 10 over the last few minutes, which is generally more desirable from the standpoint of a load despatcher or system operator than instantaneous indications would be, since he does not have to watch this particular instrument so closely to ascertain the average load carried by the distant station A.

It will be noted that all of the position determining elements are energized from the common alternating current source 15, which will be ordinarily, but not necessarily, connected to the power system metered at station A. In the event that this source should fail, the whole telemetric system will cease to function, but the indicators at stations B and C will remain in their last indicating positions, thereby showing the load on station A when the system failed. This will be extremely helpful information to the system operator at station C in getting the system back into normal operation. Since motors 30 and 45 are both supplied from a common alternating current source, any variation in frequency of such source will not be reflected in an erroneous indication at station C because the two motors will speed up and slow down together if changes in frequency occur.

While I have represented an indicating instrument at station A, I do not wish to be limited thereto.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States is:

1. In a telemetric system, sending and receiving stations, electric impulse transmitting and receiving devices at said stations respectively, the transmitter at the sending station comprising means driven by a constant speed electric motor and controlled in accordance with the indication to be transmitted to transmit impulses at a rate dependent upon such indication, the receiving device at said receiving station comprising a varable ratio differential movement, one member of which is driven at the rate of the transmitted impulses and the other member of which is driven by a constant speed electric motor, said two motors being energized by a common source of supply whereby the indication of the receiving device will remain fixed should said supply fail.

2. A telemetric system as claimed in claim 1, characterized by the fact that the electric motors are constant speed alternating current motors and the common source of supply an alternating source whereby variations in frequency are compensated for by simultaneous corresponding changes in the speeds of the two motors.

3. In a telemetric system, a rotative member, the movements of which it is desired to reproduce at a distant point, an electric motor controlled by the rotative movements of said member, a second electric motor, an electric impulse transmitter driven by said second electric motor, and means controlled by said first mentioned motor for varying the setting of said impulse transmitter, so as to vary the rate of the transmitted impulses in accordance with the rotative position of said member, said two motors being energized by a common source of supply whereby the setting of said impulse transmitter will remain fixed and its operation stopped in case of a failure in said source of supply.

In witness wherof, I have hereunto set my hand this second day of December, 1924.

WALTER P. BLANCHARD.